United States Patent
Chu et al.

(10) Patent No.: US 7,778,204 B2
(45) Date of Patent: Aug. 17, 2010

(54) AUTOMATIC MAINTENANCE OF A DISTRIBUTED SOURCE TREE (DST) NETWORK

(75) Inventors: Thomas P. Chu, Englishtown, NJ (US); Ramesh Nagarajan, Princeton Junction, NJ (US); Yung-Terng Wang, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 84 days.

(21) Appl. No.: 12/179,872

(22) Filed: Jul. 25, 2008

(65) Prior Publication Data

US 2010/0020719 A1    Jan. 28, 2010

(51) Int. Cl.
*H04L 12/28*    (2006.01)
(52) U.S. Cl. .................................. 370/254
(58) Field of Classification Search ............... 370/254, 370/231, 216, 389, 328, 390, 432, 395, 408, 370/256, 248, 228, 217, 221, 225–227; 709/229, 709/244, 230, 238, 224, 200, 245, 218, 223; 455/456, 502, 524, 356
See application file for complete search history.

(56) References Cited

U.S. PATENT DOCUMENTS

| 5,537,547 | A * | 7/1996 | Chan et al. ................. 709/230 |
| 7,315,897 | B1 * | 1/2008 | Hardee et al. .............. 709/229 |
| 2003/0193890 | A1 * | 10/2003 | Tsillas et al. ................ 370/216 |
| 2004/0202120 | A1 * | 10/2004 | Hanson ....................... 370/328 |
| 2005/0094566 | A1 * | 5/2005 | Hares ......................... 370/238 |
| 2005/0265260 | A1 * | 12/2005 | Zinin et al. ................. 370/255 |
| 2006/0218296 | A1 * | 9/2006 | Sumner ....................... 709/238 |
| 2006/0218301 | A1 * | 9/2006 | O'Toole et al. ............. 709/244 |
| 2006/0221958 | A1 * | 10/2006 | Wijnands et al. ........... 370/389 |

OTHER PUBLICATIONS

Rajesh Balay and Jeff Parker, ISIS Mesh Groups Mesh Groups for IS-IS, Jun. 3, 1999, Torrent Networks, Inc. and Nexabit networks, Inc.*

(Continued)

*Primary Examiner*—Pankaj Kumar
*Assistant Examiner*—Prenell P Jones
(74) *Attorney, Agent, or Firm*—Mendelsohn, Drucker & Associates, P.C.; Edward J. Meisarosh; Steve Mendelsohn

(57) ABSTRACT

In one embodiment, an automatically maintained, distributed source tree (DST) network has a plurality of fully connected internal nodes. One or more internal nodes may be connected to one or more external nodes. A first internal node synchronizes its link-state database with another internal node by sending and receiving respective Reduced Sequence Number Packet-Data-Units (PDUs) (RSNPs). An RSNP includes summary information for link-state packets (LSPs) (1) originated by the first internal node, (2) received by the first internal node from the other internal node, and (3) received from and/or originated by external nodes. If an internal link fails, then the corresponding end-nodes may recover and maintain automatic DST operation by entering either relay-mode or switch-mode operation. In relay-mode operation, an end-node tunnels packets to the other end-node via an intermediary node. In switch-mode operation, an intermediary node is selected to forward packets from one end-node to the other end-node.

24 Claims, 6 Drawing Sheets

OTHER PUBLICATIONS

IEEE Standard for Local and Metropolitan Area Networks: Media Access Control (MAC) Bridges, IEEE Computer Society, IEEE Std 802.1D™-2004, Jun. 24, 2004, www.standards.ieee.org [Retrieved on 04/2908] Retrieved from Internet: URL <http://standards.ieee.org/getieee802/download/802.1d-2004.pdf> (281 pages).

RFC 1195, "Use of OSI IS-IS for Routing in TCP/IP and Dual Environments," R. Callon, Digital Equipment Corporation, Network Working Group, Dec. 1990, www.ietf.org [Retrieved on May 6, 2008] Retrieved from Internet: <URL: http://www.ietf.org/rfc/rfc1195.txt (87 pages).

RFC 2973, "IS-IS Mesh Groups," R. Balay et al., CoSine Communications, Juniper Networks, Axiowave Networks, Network Working Group, Oct. 2000, www.ietf.org [Retrieved on Apr. 24, 2008] Retrieved from Internet: <URL: http://www.ietf.org/rfc/rfc2973.txt> (8 pages).

\* cited by examiner

FIG. 1
PRIOR ART
100

| Field | Size |
|---|---|
| INTRA-DOMAIN ROUTING PROTOCOL DISCRIMINATOR | 1 |
| HEADER LENGTH INDICATOR | 1 |
| VERSION/PROTOCOL ID EXTENSION | 1 |
| ID LENGTH | 1 |
| R \| R \| R \| PDU TYPE | 1 |
| PDU VERSION | 1 |
| RESERVED | 1 |
| MAXIMUM AREA ADDRESSES | 1 |
| PDU LENGTH | 2 |
| REMAINING LIFETIME | 2 |
| LSP-ID | 8 |
| SEQUENCE NUMBER | 4 |
| CHECKSUM | 2 |
| P \| ATT \| ATT \| ATT \| ATT \| OL \| IS TYPE | 1 |
| TLV SECTION | 0-1465 |

101 — (brace covering ID LENGTH through PDU TYPE rows)
102 — REMAINING LIFETIME
103 — LSP-ID
104 — SEQUENCE NUMBER
105 — CHECKSUM
106 — TLV SECTION

SIZE IN BYTES

800

AUTOMATIC MAINTENANCE OF A DISTRIBUTED SOURCE TREE (DST) NETWORK

BACKGROUND OF THE INVENTION

1. Field of the Invention

The current invention relates to data networks, and in particular, to the distribution of network-topological messages in a data network.

2. Description of the Related Art

A data network enables the transport of data packets from a source end-point to a destination end-point. A typical data network comprises multiple nodes, known as routers, that route the data packets from the source to the destination. Note that a network may be defined so as to exclude from the network nodes that are nevertheless connected to the network. Thus, external nodes may be connected to nodes within the network, where the external nodes are not part of the network. Additionally, a single node may belong to more than one network. Nodes typically comprise a processor, memory, and one or more communication ports.

Data packets include destination addresses in their headers, which allow routers to determine how to forward the data packets. A typical router maintains a routing table, also known as a routing information database (RIB), to store network-topology information to allow the router to forward data packets towards the packets' corresponding destinations. Routing tables are typically updated dynamically and automatically to reflect changes in network topology and performance.

Routers in a particular data network are compatible with the particular routing protocol of that data network. A typical routing protocol includes a methodology for routers to exchange network topology information. The typical routing protocol also includes an algorithm for a router to execute for calculating a best path for routing a given data packet to a destination, where the best path is based on the contemporary topology information.

There are two major classes of routing protocols: vector protocols and link-state protocols. Examples of vector protocols include RIP (Routing Information Protocol), IGRP (Interior Gateway Routing Protocol), and EIGRP (Enhanced Interior Gateway Routing Protocol). Examples of link-state protocol include OSPF (Open Shortest Path First) and IS-IS (Intermediate System to Intermediate System). OSPF and IS-IS are currently maintained by working groups in the IETF (Internet Engineering Task Force). Link-state protocols are generally considered to be more robust and to allow faster convergence times than vector protocols, particularly in large networks. Therefore, link-state protocols are typically preferred in larger networks. OSPF is often preferred for enterprise networks, while IS-IS is often preferred for core networks, such as ISP (Internet Service Provider) backbone networks.

The IS-IS protocol can be used to support any OSI (Open System Interconnection) layer-3 protocol such as, e.g., IP (Internet Protocol) or CLNP (Connectionless Network Protocol). A description of the use of the IS-IS protocol with TCP/IP (Transfer Control Protocol/Internet Protocol) can be found in IETF RFC (Request for Comment) 1195, titled "Use of OSI IS-IS for Routing in TCP/IP and Dual Environments," incorporated herein by reference in its entirety. Among the message types supported by the IS-IS protocol are LSP (link-state packet; also link-state PDU (packet data unit)), CSNP (Complete Sequence Number PDU), and PSNP (Partial Sequence Number PDU).

An LSP contains information about the links at the LSP's originating node. A link is a (direct or virtual) connection to another node and may be identified by a communication port on the originating node and a peer communication port on the other node. Links can go up, come down, or be otherwise modified. LSPs are sent out by an originating node in order to provide information to the other nodes in a network about the condition and status of the links at the originating node. Information from received LSPs is maintained by a receiving node in the receiving node's link-state database, where each link-information entry of the link-state database corresponds to a received or generated LSP. Thus, received LSPs are used to update a receiving node's link-state database. The operating details of particular implementations of link-state databases are implementation-specific and may vary.

FIG. 1 shows the format of typical LSP 100, with field sizes in bytes appearing on the right side. LSP 100 includes PDU-type field 101, remaining-lifetime field 102, LSP-ID field 103, sequence-number field 104, checksum field 105, and TLV (tag-length-value) section 106. PDU-type field 101 identifies the PDU as an LSP. Remaining-lifetime field 102 specifies the length of time that the information in LSP 100 should be considered valid. LSP-ID field 103 identifies the originating node of the LSP. Sequence number 104 identifies the sequential number of the LSP from the LSP-originating node. LSP-originating nodes increment the sequence number for generated LSPs having new information to alert receiving nodes that corresponding link-state database information should be updated. Nodes may re-send LSPs with unchanged information in response to requests, as refreshers, or for other reasons. Thus, an LSP-originating node may generate multiple, substantially identical LSPs even if that node has no new link-state information to report. Checksum 105 is a checksum value used to determine if there are transmission errors in LSP 100. TLV section 106 is the payload of LSP 100 and may contain a variety of parameters, each identified by a parameter tag, a parameter length, and a parameter value.

A CSNP contains a listing and summary of all the LSPs maintained in the link-state database of the CSNP-originating node. CSNPs are used to synchronize the link-state databases of neighboring network nodes. A summary entry for an LSP in a CSNP includes the remaining lifetime, the LSP-ID, the sequence number, and the checksum. Based on these parameters, a CSNP-receiving node can determine whether synchronization of information is necessary, in which case the nodes can synchronize by the transmission of the appropriate LSP(s). A complete summary of a link-state database may be divided and sent over multiple CSNPs if a single CSNP packet is not sufficiently large to accommodate the complete summary.

If, for example, a fully connected (i.e., where each node is connected to every other node by a corresponding link) IS-IS network has 300 nodes, then it will have 44,850 (=300*299/2) links. Thus, each node in the network will have at least 44,850 entries in its link-state database, and each synchronization will require sending CSNPs having at least 44,850 entries. If the CSNP is sent over Ethernet where each packet is limited to about 1500 octets of data, then each CSNP packet can contain about 90 entries, meaning that about 500 packets will be required for the transmission of just one CSNP. This amount of traffic for a synchronization can degrade network performance.

A PSNP contains a listing and summary of a subset of the LSPs in the link-state database of the PSNP-originating node. PSNPs are used to acknowledge receipt of one or more LSPs and to request one or more LSPs from a neighboring node.

IS-IS nodes distribute LSPs by flooding. When a node determines that the status of one or more of its links has changed, it generates a corresponding LSP and sends it to all the nodes to which it is linked on the network (i.e., the node's neighbors). When a node receives an LSP from a sending node, the receiving node compares the LSP's LSP-ID and sequence number to the LSP-ID and sequence number in the receiving-node's link-state database. If the LSP-ID is not stored in the link-state database, then the receiving node adds the information of the received LSP to the receiving node's link-state database. The receiving node then forwards the LSP to all its neighbors, except the sending node. If the LSP-ID is already in the receiving node's link-state database and the sequence number of the received LSP is the same as the stored sequence number for the corresponding LSP-ID, then the receiving node determines that the LSP contains no new information and ignores the LSP.

If the sequence number of the received LSP is higher than the stored sequence number for the corresponding LSP-ID, then the receiving node determines that the LSP contains new information and (i) updates its link-state database based on the received LSP and (ii) forwards the LSP to all the nodes to which it is linked, other than the node which sent the receiving node the LSP. If the sequence number of the received LSP is lower than the stored sequence number for the corresponding LSP-ID, then the receiving node determines that the sending node's link-state database needs updating, and the receiving node sends its stored LSP information for the corresponding LSP-ID (with the higher sequence number) from its link-state database to the sending node. This flooding process helps guarantee that new LSPs are distributed to all the nodes in a network so that all those nodes have up-to-date link-state information.

FIG. 2 shows an illustration of exemplary LSP flooding in fully connected network 200. A fully connected network is a network whose nodes have links to all the other nodes in the network. Note that these links can be virtual (a.k.a. logical) connections and do not have to be direct (a.k.a. physical) connections. Similarly, a highly connected network is a network where most of the nodes have links to most of the other nodes in the network. Network 200 comprises interconnected nodes 201, 202, 203, 204, 205, and 206. In step 1 of FIG. 2(a), node 201 originates a new LSP and forwards it to all the nodes to which it is linked, i.e., nodes 202, 203, 204, 205, and 206. In step 2 of FIG. 2(b), each of nodes 202, 203, 204, 205, and 206 forwards the LSP to every node to which it is linked, other than the node from which it received the LSP. Thus, each of nodes 202, 203, 204, 205, and 206 forwards the LSP to four other nodes (e.g., node 206 forwards the LSP to nodes 202, 203, 204, and 205). In effect, each of nodes 202, 203, 204, 205, and 206 receives and processes the same LSP five times. Note that, when a node (e.g., 202, 203, 204, 205, and 206) receives subsequent copies of the same LSP, the node will not forward the LSP again.

Flooding in a fully or highly connected network can become a growing concern as the number of nodes increases. For example, if a node in a fully connected network of 300 nodes originates a new LSP, then every other node in that network will receive and process 299 copies of that LSP—one from the originating node, and one from each of the 298 other nodes in the network. Processing that many LSPs can noticeably degrade the performance of a node. Even more problematic is the situation where one of the 300 nodes fails. When a node fails, its neighbors detect that their respective connecting links to the failed node are not operating. Upon the detection of the respective link failure, each of the failed node's 299 neighbors originates an LSP to forward to the 298 other nodes indicating that the respective link to the failed node has failed. Each LSP will be flooded through the network as per the algorithm outlined above. Thus, when the one node fails, each of the other nodes will receive close to 90,000 LSPs (~298*298). Trying to process that many LSPs in a short period can put a serious, or even debilitating, strain on a node's processor.

As noted above, a fully connected network can be formed even where each individual node does not have direct (i.e., intermediary-free, physical-layer) connections to all the other nodes. In other words, nodes in a fully connected network can be linked through virtual connections. Two nodes in a network are virtually connected at a logical layer when the two nodes are physically connected via one or more intermediary nodes, where the logical layer is unaware of the physical connections involving the one or more intermediary nodes. For example, MPLS (Multi-Protocol Label Switching) is a protocol-independent packet-forwarding OSI layer-2 technology (sometimes considered a layer-2.5 technology) that allows for the rapid and direct-seeming transmission of layer-3 (e.g., IP) packets between MPLS nodes. This is accomplished partly by pushing labels onto layer-3 (e.g., IP) packets and using the labels to quickly route the resultant MPLS packets. In an optical network, particular wavelengths can be used as labels for protocol-independent packet forwarding.

FIG. 3 shows one possible physical implementation of fully connected network 200 of FIG. 2. Path 201a physically connects nodes 201 and 203. Paths 203a, 205a, 206a, 204a, and 202a physically connect (i) nodes 203 and 205, (ii) nodes 205 and 206, (iii) nodes 206 and 204, (iv) nodes 204 and 202, and (v) nodes 202 and 201, respectively. Using a protocol-independent packet-forwarding technology, such as MPLS, virtual or logical connections can be established among the nodes of network 200 which would appear as links to layer-3 network systems. Thus, to IP network 200, the six nodes appear fully connected. For example, node 201 would be able to transmit an LSP to node 206 where the LSP would be physically transmitted via nodes 203 and 205, but without any processing, or even awareness, by layer-3 network systems on nodes 203 and 205.

As noted above, flooding messages in a highly connected network can put a deleterious strain on system performance. One proposal to mitigate the problem is the establishment of mesh groups as presented in RFC 2973, titled "IS-IS Mesh Groups," incorporated herein by reference in its entirety. A mesh group is a group of connections among nodes, where the connections are administratively configured to belong to a particular group. A mesh group can be used to avoid flooding LSP packets by forwarding LSPs only on a subset of ports, instead of substantially all of a node's ports. Limiting the number of LSP packets sent out by a node reduces the detrimental effects of flooding. It should be noted that mesh-group limitations apply to the distribution of LSP packets. Link-state-limited links remain fully active and available for the transmission of bearer or other types of packets.

The mesh groups described in RFC 2973 can be set up by setting the links in the network to one of three settings: meshBlocked, meshInactive, or meshSet. By default, links are in the meshInactive state, where the ports defining the links behave as though mesh groups have not been set up. When a node receives an LSP from a meshInactive link, the node forwards the LSP via all other links which are not in a meshBlocked state. A node will forward any received LSPs via all other meshInactive links. Original LSPs will be transmitted via all meshInactive links. No LSPs are forwarded via meshBlocked links. No LSPs should come in from a meshBlocked link since the corresponding node should not forward LSPs via the meshBlocked link. Links in the meshSet state have an associated parameter, meshGroup, which identifies a corresponding mesh group. If a node receives an LSP from a meshSet link, then the node will forward the LSP via all the meshInactive links and on meshSet links that have a meshGroup parameter different from the meshGroup parameter of the ingress link. For example, if a node receives an LSP from a meshSet ingress link whose meshGroup is 1, then it will not forward the LSP via any meshSet links whose meshGroup is 1. MeshSet meshGroups are complicated and not often used.

FIG. 4 shows an illustration of an exemplary operation of a mesh group in network 400 in accordance with RFC 2973. Network 400 comprises interconnected nodes 401, 402, 403, 404, 405, and 406. The FIG. 4 links in bold belong to meshGroup 1, while the dashed links belong to meshGroup 2. No links in network 400 are in the meshBlocked or meshInactive state. If node 401 generates an LSP, then, as illustrated in step 1 of FIG. 4(a), node 401 forwards the LSP on all of its links. The other nodes then forward the LSP received from node 401 via links that belong to meshGroups that both (1) are different from the meshGroup of the ingress link and (2) did not already transmit that LSP. Node 404, for example, received the LSP from node 401 via a group-2 link, and forwards the LSP via its group-1 links to nodes 402 and 406. After step 2 of FIG. 4(b), the flooding of network 400 is complete because every node has sent or received the LSP via every meshGroup through which it is linked. As can be seen, because of the meshGroups in network 400, fewer LSPs are transmitted and processed in network 400 than in network 200 of FIG. 2.

RFC 2973 also describes another use of meshGroup parameters sometimes called "poor man's mesh groups," herein referred to as flow-through mesh groups (FTMGs). In a flow-through mesh group, the meshSet state is not used. Instead, certain links are set to meshBlocked to prune the flooding topology. This creates a group of links through which LSPs flow.

FIG. 5 shows an illustration of an exemplary operation of a flow-through mesh group in network 500. Network 500 comprises six interlinked nodes 501-506. The links in bold are set to meshInactive and belong to flow-through mesh group 507. The dashed links are set to meshBlocked. If node 501 generates an LSP, then, as shown in step 1 of FIG. 5(a), node 501 forwards the LSP via its meshInactive ports to nodes 502 and 503. Then, as shown in step 2 of FIG. 5(b), nodes 502 and 503 forward the LSP via their meshInactive ports, other than the ingress ports, to nodes 504 and 505, respectively. Nodes 504 and 505 similarly then each forward the LSP via their meshInactive ports, other than the ingress ports, to node 506, as shown in step 3 of FIG. 5(c). After step 3, the flooding of network 500 is complete. As can be seen, because of flow-through mesh group 507 in network 500, fewer LSPs are transmitted and processed in network 500 than in network 400 of FIG. 4. However, the LSP-update system of network 500 is less robust than that of both network 200 of FIG. 2 and network 400 of FIG. 4, because, if any two links of flow-through mesh group 507 fail, then at least one node will no longer get LSPs from the other nodes.

The mesh groups proposed by RFC 2973 need to be manually designed and implemented by the network administrator. Subsequent maintenance of the mesh groups is also performed manually by the network administrator. The prior-art systems are prone to set-up errors and to slow reactions to network problems and/or evolving network requirements.

SUMMARY OF THE INVENTION

In one embodiment, the invention is a first node for a communications network comprising a plurality of nodes interconnected by a plurality of links, the plurality of nodes comprising the first node. The first node comprises one or more ports and a processor. The first node and one or more other nodes of the communications network are internal nodes of a distributed source tree (DST). Nodes of the communications network that are not in the DST network are external nodes. Each port of the first node is adapted to (1) link the first node to a peer node in the communications network, wherein the peer node is either an internal node or an external node and (2) send and receive link-state packets (LSPs), wherein each LSP comprises information for a link of the plurality of links. The processor is adapted to (1) process a received LSP during normal operation, wherein, during the normal operation, the processing comprises (i) forwarding the LSP to the other nodes of the DST network, if the LSP is received from an external node, and (ii) not forwarding the LSP to the other nodes of the DST network, if the LSP is received from an internal node, and (2) perform automatic maintenance of the DST network using at least one of reduced-set synchronization and recovery operation.

In another embodiment, the invention is a method in a first node for a communications network comprising a plurality of nodes interconnected by a plurality of links, the plurality of nodes comprising the first node. The first node and one or more other nodes of the communications network are internal nodes of a distributed source tree (DST). Nodes of the communications network that are not in the DST network are external nodes. The first node is linked to a peer node in the communications network, wherein the peer node is either an internal node or an external node. The method comprises: (a) receiving link-state packets (LSPs), wherein each LSP comprises information for a link of the plurality of links, (b) processing a received LSP during normal operation, wherein, during the normal operation, the processing comprises: (i) forwarding the LSP to the other nodes of the DST network, if the LSP is received from an external node, and (ii) not forwarding the LSP to the other nodes of the DST network, if the LSP is received from an internal node, and (c) performing automatic maintenance of the DST network using at least one of reduced-set synchronization and recovery operation.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows the format of a typical link-state packet (LSP).

DETAILED DESCRIPTION

In one embodiment of the present invention, a distributed source tree (DST) network is automatically maintained. A DST network comprises a collection of interlinked nodes, where the nodes in the DST network form a fully connected network. The nodes in the DST network, herein referred to as internal nodes, may be also be linked to external nodes, i.e., nodes that are not part of the DST network. Thus, the DST network may be viewed as a fully connected sub-network within a larger network. Links between two internal node are referred to herein as internal links. The two nodes connected by a link are referred to herein as end-nodes. As noted above, the link between any two nodes of the DST network may be a virtual connection or a direct connection. All the links among internal nodes and links between internal nodes and external nodes are in DST active states. A DST network is initially set up administratively by defining the DST network and its member nodes. Once set up, the internal nodes automatically maintain the DST network as described below.

If an internal node generates an LSP, then that node transmits that LSP to all the nodes to which it is connected, i.e., that node transmits that LSP to both the internal nodes and the external nodes to which that node is connected. If an internal node receives an LSP from another internal node, then the receiving node forwards the LSP only to any external nodes to which the receiving node may be connected, i.e., the receiving node does not forward the LSP to any internal nodes. If an internal node receives an LSP from an external node, then the receiving node forwards the LSP to (i) all the other internal nodes and (ii) all the external nodes to which the receiving internal node is connected, other than the sending external node. Using this system, all the internal nodes of the DST networks receive one and only one copy from the DST network of an internally originated LSP, if there are no external nodes in the network. (Note that additional copies of an internally originated LSP may be received from linked external nodes.) That one copy of the internally originated LSP is received directly from the originating internal node. This greatly reduces the deleterious effects of flooding in a fully connected network while still ensuring that each internal node gets a copy of an LSP. Note that, if, for example, an external node is connected to two internal nodes and the external node originates an LSP, then each internal node will receive two copies of the LSP—(a) each of two internal nodes connected to the originating external node will receive one from the external node and one from the other internal node connected to the external node and (b) each of the other internal nodes will receive one from each of the two internal nodes connected to the originating external node.

Figure 6:
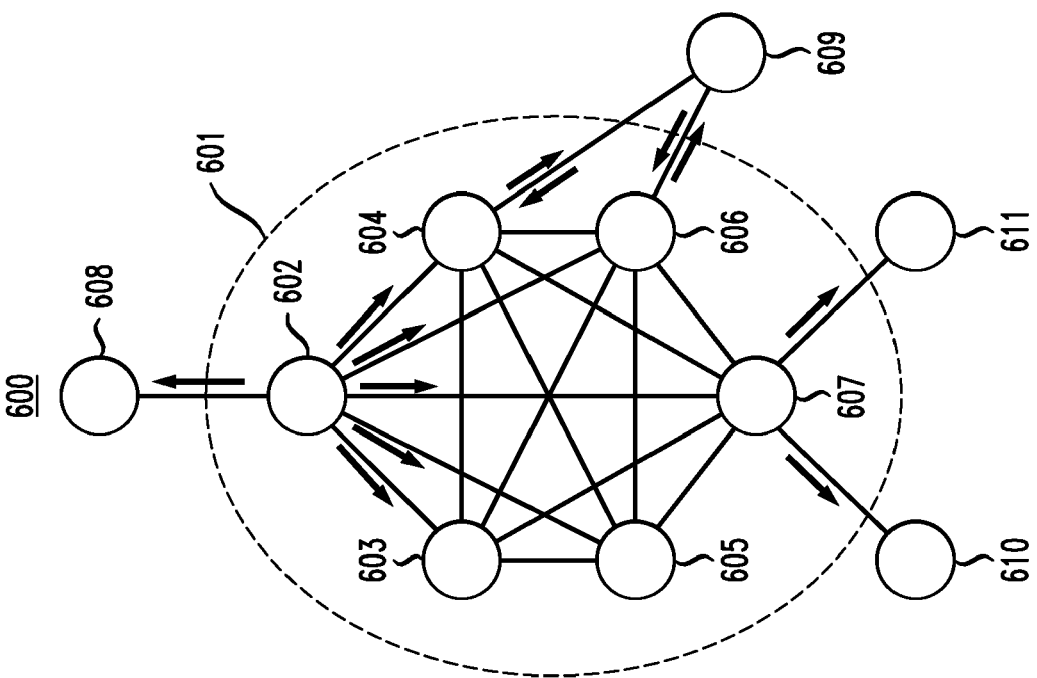
FIG. 6 illustrates an exemplary LSP transmission in an exemplary network comprising a distributed source tree (DST) network (or sub-network).

FIG. 6 illustrates an exemplary LSP transmission in exemplary network 600 comprising DST network (or sub-network) 601. DST network 601 comprises interconnected internal nodes 602, 603, 604, 605, 606, and 607. Network 600 also comprises external nodes 608, 610, 611, and 609. External node 608 is connected to internal node 602. External nodes 610 and 611 are connected to internal node 607. External node 609 is connected to internal nodes 604 and 606. FIG. 6 shows the paths of LSP messages transmitted if internal node 602 originates an LSP message. Node 602 transmits the LSP message to all the nodes to which it is connected, i.e., internal nodes 603, 604, 605, 606, and 607, and external node 608. Internal nodes that have no external links, e.g., nodes 603 and 605, do not further transmit that LSP. Node 607 forwards the LSP to external nodes 610 and 611.

Node 604 forwards the LSP to external node 609, unless it first gets a copy of the LSP from node 609. Node 609 in turn forwards the LSP to internal node 606, unless node 609 first gets a copy of the LSP from node 606. Node 606 forwards the LSP to external node 609, unless it first gets a copy of the LSP from node 609. Node 609 in turn forwards the LSP to internal node 604, unless node 609 first gets a copy of the LSP from node 604. It should be noted that, despite the above description, redundant LSPs may be transmitted if, for example, a received second copy of the LSP is being processed while a received first copy of the LSP is being forwarded to the sender of the second copy of the LSP.

Figure 2:
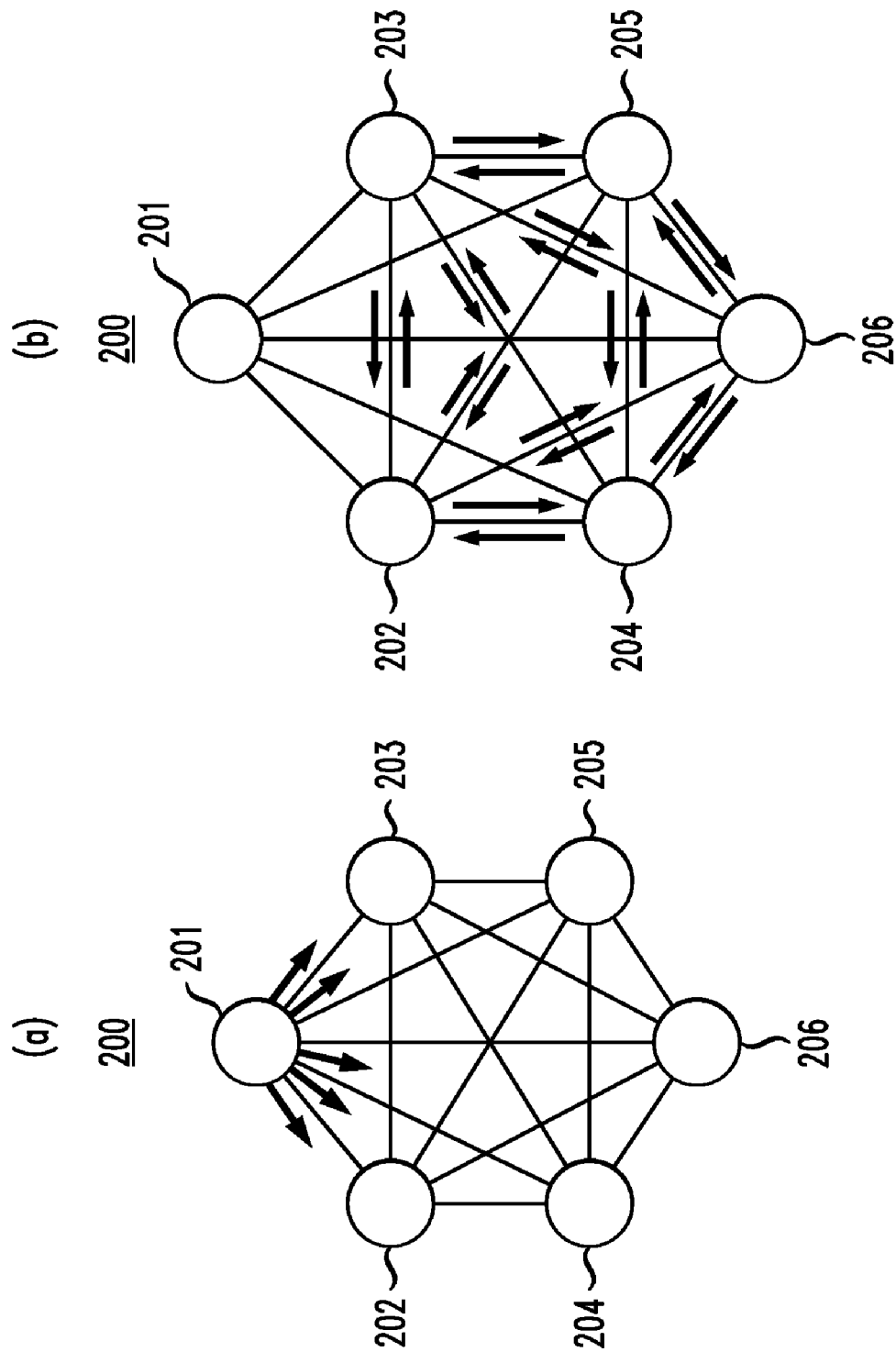
FIG. 2 shows an illustration of exemplary LSP flooding in a fully connected network.
Figure 4:
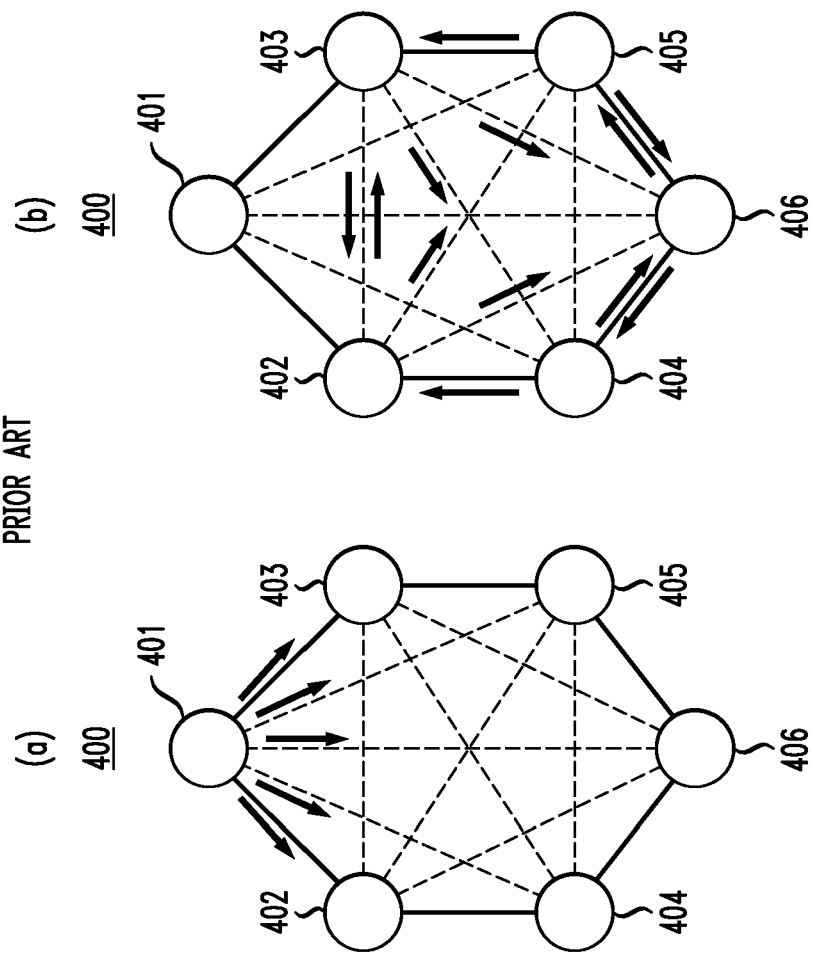
FIG. 4 shows an illustration of an exemplary operation of a mesh group in a network in accordance with RFC 2973.
Figure 3:
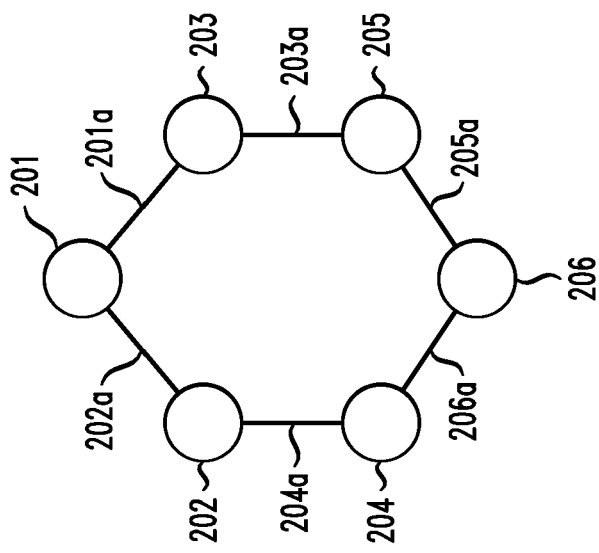
FIG. 3 shows a possible physical implementation of the fully connected network of FIG. 2.
Figure 5:
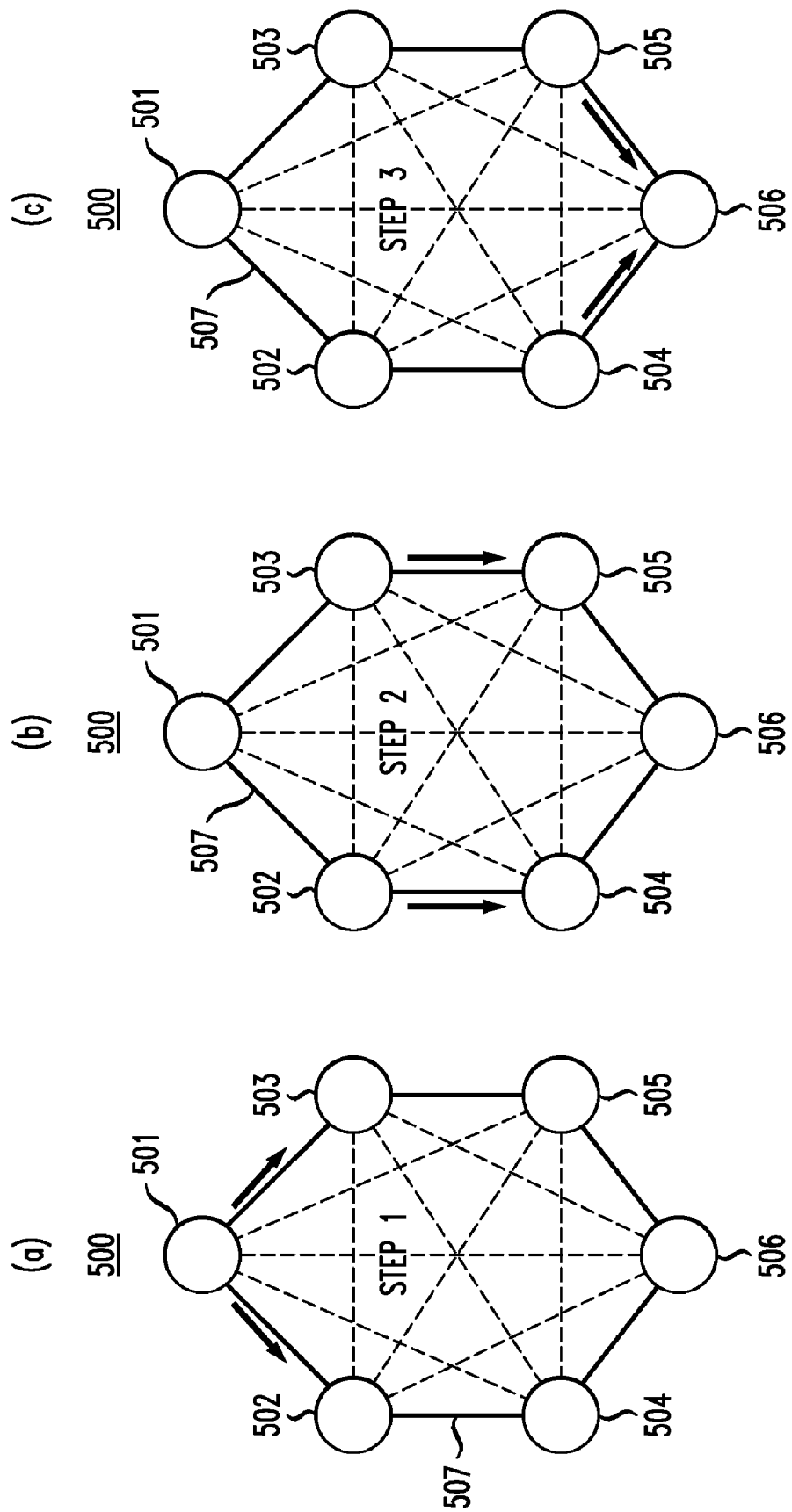
FIG. 5 shows an illustration of an exemplary operation of a flow-through mesh group in a network.
Figure 7:
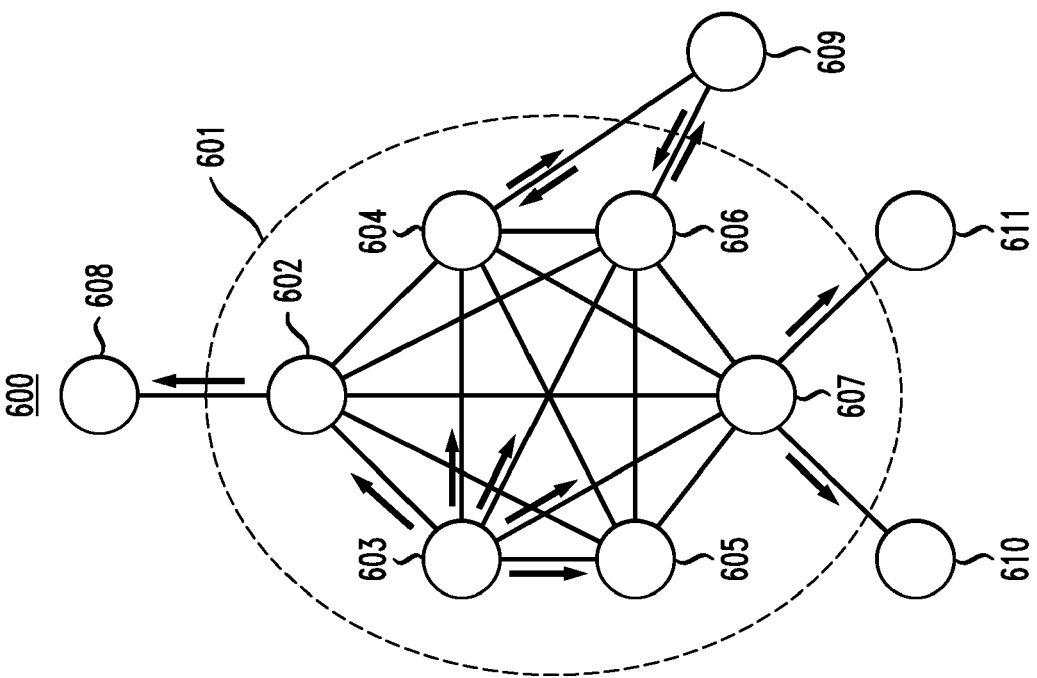
FIG. 7 illustrates another exemplary LSP transmission in the network of FIG. 6.

FIG. 7 illustrates another exemplary LSP transmission in network 600 of FIG. 6. If internal node 603 originates an LSP, then node 603 transmits the LSP over all its links to all the nodes to which it is connected, i.e., internal nodes 602, 604, 606, 607, and 605. Internal node 602 forwards the LSP to external node 608. At least one of internal nodes 604 and 606 forwards the LSP to external node 609, which in turn may forward the at least one LSP to at least one of nodes 606 and 604, respectively. Internal node 607 forwards the LSP to external nodes 610 and 611. Internal node 605 does not forward the LSP.

The nodes in a DST network maintain respective link-state databases. As part of that maintenance, a node may intermittently synchronize its link-state database with the other nodes to which the node is linked. As described above, the IS-IS protocol calls for an exchange of CSNPs to synchronize the link-state databases of two nodes, where the exchange can require the transmission of an exorbitant number of data packets. In this embodiment of the invention, however, nodes use reduced-set synchronization. With reduced-set synchronization, two nodes in a DST network synchronize their respective link-state databases by the exchange of Reduced Sequence Number PDUs (RSNPs).

An RSNP is substantially similar in structure to a CSNP, but includes (1) summaries for only a subset of the links maintained by the corresponding node's link-state database and (2) an indication that it is an RSNP rather than CSNP (note that this indication may be explicit or implicit). It should be noted that using RSNPs effectively partitions a link-state database, and a node can reconstruct its entire link-state database by combining the RSNPs it exchanges with all its peers (including reconciling duplicate LSP summaries).

The subset of LSPs included in an RSNP sent from a sending node to a receiving node comprises summaries of (1) LSPs originated by the sending node, (2) LSPs received by the sending node from the receiving node, and (3) externally originated LSPs received by the sending node from external nodes. Thus, if, for example, nodes 604 and 606 synchronize their link-state databases, then (1) node 604 sends to node 606 an RSNP summarizing the LSPs (a) originated by node 604, (b) received by node 604 from node 606, and (c) received from node 609 and originated by any external node and (2) node 606 sends to node 604 an RSNP summarizing the LSPs (a) originated by node 606, (b) received by node 606 from node 604, and (c) received from node 609 and originated by any external node.

One way to memorialize which LSPs were received from external links is by modification of the link-state database. Note that the link-state database already maintains the originating node of an LSP. The link-state databases of nodes in the DST network are modified to include an Upstream Sending Node (USN) field which indicates, for every LSP in the database, which node forwarded that particular LSP to the respective node. The link-state database of node 602 of FIG. 6 may, for example, include an LSP whose originating node is node 611 and whose USN is node 607. Compared to the CSNP with almost 45,000 entries discussed above, a corresponding RSNP in a DST network of 300 nodes (with no external nodes) would have only 598 (i.e., 2*299) entries.

If a physical link in network 600 of FIG. 6 fails, lower-layer systems may repair the failure so that the network may return to appearing the same to the layer-3 IS-IS protocol even though the network is now physically different. One such recovery method can involve the MPLS discussed above. In some cases, the lower layers may be unable to repair the failure. Several recovery mechanisms are available, such as a relay-mode recovery and a switch-mode recovery. It should be noted that these recovery mechanisms can also be used to set up a DST network for a set of interlinked nodes that are highly, but not fully, connected.

In relay-mode recovery, one or more intermediary internal nodes are used to relay packets from an internal source node to an internal destination node. In essence, packets are tunneled from the source node to the destination node via the intermediary node(s). If, for example, the link between nodes 602 and 604 fails, then node 602 could relay IS-IS messages (such as LSPs, CSNPs, PSNPs, and RSNPs) to node 604 via node 603. Node 604 might also choose node 603 as a relay node for link-state messages to 602, or node 604 might choose a different node. Node 602 may pick node 603 as the relay node based on information in one or more of node 602's network-information databases. However, node 602 may instead pick node 603 using a dynamic method for detecting an available path to node 604. Node 602 would then relay IS-IS messages to node 604 via node 603 using relay packets. In one implementation, relay packets can be enveloped IS-IS messages.

Figure 8:
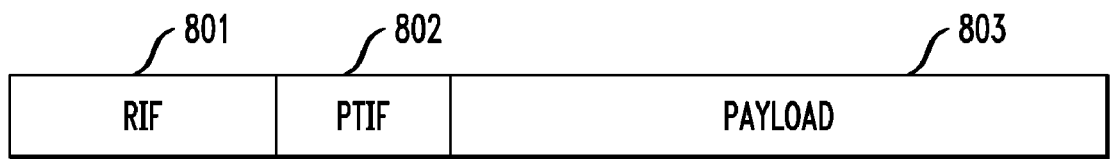
FIG. 8 shows the format of an exemplary relay packet.

FIG. 8 shows relay packet 800 comprising relay information field (RIF) 801, payload-type indication field (PTIF) 802, and payload 803. RIF 801 instructs intermediate nodes to forward packet 800 to the destination node without processing its payload. PTIF 802 indicates whether payload 803 is an IS-IS packet or a relay-control packet. A relay-control packet contains information and instructions for intermediary, source, and/or destination nodes to allow them to set up and maintain the relay-mode recovery system. Payload 803 is the message itself for the destination node, where the message may be an IS-IS packet or a relay-control packet.

In another implementation, relay packets are substantially standard IS-IS messages but with a special header designation indicating that the packets are relay packets rather than the substantially similar IS-IS messages. For example, LSP 100 of FIG. 1 can be modified into a relay packet by defining a new value for PDU-type field 101 that would indicate that the modified LSP 100 is a relay packet and not a regular LSP.

In one implementation, source routing is used to forward relay packets. Source routing involves enveloping a payload with a forward path list and a backward path list. At the source node, the forward path list comprises the addresses of the destination node and all intermediary nodes in order, while the backward path list consists of the address of the source node. The order of nodes in the forward path list indicates the order of nodes to be traversed, while the order of nodes in the backward path list indicates the order of nodes that were already traversed. As the relay packet is forwarded from the source node to the destination node, each intermediary node removes its address from the forward path list and appends it to the backward path list. The destination node can then use the backward path list to create a forward path list for a reply packet to the source node. However, the destination node may instead use a different path for a reply to the source node. The backward path list can also be used to transmit error messages from any intermediary nodes back to the source node.

If a source node does not have sufficient information in its network-information databases to determine a path to the destination node, or if the source node wants to dynamically determine a path to the destination node for another reason, then the source node may use broadcasting to find a path to the destination node. The source node broadcasts a path-detection (PD) message to all its neighbors, where the PD message comprises a forward path list containing an identification of the destination node. The neighbors in turn broadcast the PD message to their neighbors, and so on for a set period of time or number of re-broadcasts. As the PD messages are re-broadcast, each node adds its address to a backward path list. If the PD message reaches the destination node, then the destination sends a corresponding reply to the source node, where the reply indicates a path to the destination node from the source node.

In switch-mode recovery, a source node requests that an intermediary node forward all LSPs from the source node to the destination node. If, for example, the link between nodes 602 and 604 of FIG. 6 fails, then node 602 could request node 603 to act as its switch-mode intermediary node for node 604. This request is made by sending a switch-mode request to node 603 that includes an identification of node 604. Node 603 indicates acceptance or rejection with a switch-mode request response. If node 603 accepts the request, then node 603 would transmit to node 604 (1) LSPs originated by node 603, (2) LSPs received from external nodes, and (3) LSPs originated by node 602. Intermediary switch-mode node 603 sends a switch-mode indication message to destination node 604 indicating that node 603 is acting as an intermediary switch-mode node between node 602 and node 604. Node 604 then responds with an indication response message indicating acceptance or rejection by node 604 of node 602 as a switch-mode intermediary node.

During switch-mode operation, when node 603 synchronizes link-state databases with node 604, node 603 will include in its RSNP to node 604 summaries of LSPs originated by node 602. Switch-mode operation can be terminated with a disconnect message sent by source node 602, intermediary node 603, or destination node 604. The disconnect message can be acknowledged with a disconnect acknowledgment message. During switch-mode operation, (a) nodes 602 and 603 and (b) nodes 603 and 604 may intermittently exchange heartbeat messages confirming that switch mode is still in operation.

When, as in the example above, the link between nodes 602 and 604 fails, node 604 will also seek a switch-mode intermediary node for transmitting IS-IS messages from node 604 to node 602. In one implementation, the node with the higher priority, in this case node 602, determines which node will serve as a switch-mode intermediary, and the lower-priority node, in this case node 604, uses that same node as its switch-mode intermediary node. In another implementation, each node independently selects a switch-mode intermediary, where the nodes' switch-mode intermediaries may be different nodes or may be the same node.

An embodiment of switch-mode recovery operation has been described where certain messages are exchanged between the nodes involved in the switch-mode recovery operation. In alternative implementations of switch-mode recovery operation, one or more of the described messages are modified or are not used. In alternative implementations of switch-mode recovery operation, one or more additional types of messages are used.

An embodiment of switch-mode recovery operation has been described where there is only one switch-mode intermediary node between the source node and the destination node. In an alternative embodiment, multiple switch-mode intermediary nodes are used between the source node and the destination node, where a message from the source node is forwarded to a first intermediary node, which in turn forwards the message to a second intermediary node, and so forth until the last intermediary node forwards the message to the destination node.

In one alternative embodiment of DST network 601 of FIG. 6, an RSNP contains summaries for (1) LSPs originated at the sending node, (2) LSPs received by the sending node from the receiving node, and (3) LSPs originated by external nodes, regardless of from which node the sending node received them. Thus, in this embodiment, there is no need for a USN field in the link-state databases.

In another alternative embodiment of DST network 601 of FIG. 6, an RSNP contains summaries for (1) LSPs originated at the sending node, (2) LSPs received by the sending node from the receiving node, and (3) LSPs received by the sending node from external nodes to which the sending node is linked regardless of the originating node. This embodiment uses the USN field in the link-state databases.

In one alternative embodiment of DST network 601 of FIG. 6, when receiving an LSP, one or more nodes disregard whether an identical LSP was already received from a node to which the receiving node would otherwise forward the received LSP. Thus, for example, if node 602 originates an LSP, then (a) node 606 would forward the LSP to node 609, (b) node 604 would forward the LSP to node 609, and (c) node 609 would forward (1) the copy received from node 604 to node 606 and (2) the copy received from node 606 to node 604.

In one alternative embodiment of the invention, a DST network is created by using mesh group technology and setting all the links of the DST network to the meshSet state, setting the links' meshGroup parameter to the same value, and adding one or more of the DST-network feature described above. For example, all the links in a fully connected network can be set to meshSet and meshGroup 1, wherein the corresponding nodes are configured to use RSNPs, thereby creating a DST network in accordance with this alternative embodiment of the invention. It should be noted that DST network 600 of FIG. 6, described above, does not use the mesh group technology described in RFC 2973.

It should be noted that current implementations of the IS-IS protocol support two levels of network operation: Level 1 and Level 2. Embodiments of the invention have been described without reference to IS-IS levels because the invention does not depend on specific protocol-implementation details such as levels. Embodiments of the invention may be designed to work on any combination of levels of a network.

Embodiments of the invention have been described in reference to the IS-IS protocol and RFC 2973. The invention is not limited to the frameworks described in those systems. Alternative embodiments of the invention utilize alternative frameworks and are not necessarily compatible with the above frameworks.

As used herein in reference to data packets and a corresponding item and unless otherwise indicated, the term "identify" and its variants mean that the data packet either (i) itself contains information identifying the item or (ii) contains information that, in conjunction with processor-accessible information located outside the data packet, is sufficient to identify the item.

References herein to the verb "to set" and its variations in reference to values of fields do not necessarily require an active step and may include leaving a field value unchanged if its previous value is the desired value. Setting a value may nevertheless include performing an active step even if the previous or default value is already the desired value.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A first node for a communications network comprising a plurality of nodes interconnected by a plurality of links, the plurality of nodes comprising the first node, the first node comprising:

one or more ports; and a processor, wherein:

the first node and one or more other nodes of the communications network are internal nodes of a distributed source tree (DST);

nodes of the communications network that are not in the DST network are external nodes;

each port of the first node is configured to:

(1) link the first node to a peer node in the communications network, wherein the peer node is either an internal node or an external node; and (2) send and receive link-state packets (LSPs), wherein each LSP comprises information for a link of the plurality of links; and the processor is configured to:
(1) process a received LSP, wherein, the processing comprises:
(i) forwarding the LSP to the other nodes of the DST network, if the LSP is received from an external node; and
(ii) not forwarding the LSP to the other nodes of the DST network, if the LSP is received from an internal node; and
(2) perform automatic maintenance of the DST network using at least one of reduced-set synchronization and recovery operation.

2. The first node of claim 1, wherein the automatic maintenance comprises using the reduced-set synchronization.

3. The first node of claim 2, wherein:
the first node and an internal second node are each configured to manage a corresponding link-state database configured to store link-information entries for the plurality of links, wherein each link-information entry corresponds to an LSP received or generated by the corresponding node;
using reduced-set synchronization comprises synchronizing the respective link-state databases of the first node and the second node by exchanging Reduced Sequence Number Packet-Data-Units (RSNPs); and
an RSNP sent by the first node to the second node does not comprise information from LSPs that are both (i) received by the first node from an internal node other than the second node and (ii) generated by an internal node.

4. The first node of claim 3, wherein an RSNP sent by the first node to the second node comprises (i) information from LSPs generated by the first node and (ii) information from LSPs sent from the second node to the first node.

5. The first node of claim 3, wherein an RSNP sent by the first node to the second node further comprises information from LSPs received by the first node from one or more external nodes linked to the first node.

6. The first node of claim 3, wherein an RSNP sent by the first node to the second node further comprises information from LSPs originated by external nodes.

7. The first node of claim 3, wherein an RSNP sent by the first node to the second node further comprises information from LSPs that are both (i) received by the first node from one or more external nodes linked to the first node and (ii) originated by external nodes.

8. The first node of claim 3, wherein each corresponding link-state database comprises an upstream sending node (USN) field for each link-information entry, wherein the USN field indicates the node from which the internal node received the LSP corresponding to the link-information entry.

9. The first node of claim 1, wherein the automatic maintenance comprises using the recovery operation.

10. The first node of claim 9, wherein the DST network is not a fully connected network.

11. The first node of claim 9, wherein:
the one or more other nodes of the DST network comprise a peer node and a first set of one or more intermediary nodes;
the first node is not linked to the peer node;
the first node is linked to at least one intermediary node in the first set;
the peer node is linked to at least one intermediary node in the first set; and
using the recovery operation comprises the first node, the peer node, and the one or more intermediary nodes using one of relay-mode recovery and switch-mode recovery.

12. The first node of claim 11, wherein the first node, the peer node, and the one or more intermediary nodes use relay-mode recovery, wherein the first node tunnels packets to the peer node through the one or more intermediary nodes.

13. The first node of claim 12, wherein, in relay-mode recovery, the peer node tunnels packets to the first node through the one or more intermediary nodes.

14. The first node of claim 12, wherein:
the DST network comprises a second set of one or more intermediary nodes;
the second set is different from the first set;
the first node is linked to at least one intermediary node in the second set;
the peer node is linked to at least one intermediary node in the second set; and
in relay-mode recovery, the peer node tunnels packets to the first node through the second set.

15. The first node of claim 11, wherein the first node, peer node, and the one or more intermediary nodes use switch-mode recovery, wherein:
the first node sends a first packet to an intermediary node in the first set but not to the peer node; and
an intermediary node in the first set forwards the first packet to the peer node, wherein that intermediary node would not forward the first packet to the peer node when not using the recovery operation.

16. The first node of claim 1, wherein the DST network is a fully connected network.

17. The first node of claim 1, wherein the first node is configured to send and receive packets using the Intermediate System to Intermediate System (IS-IS) protocol.

18. The first node of claim 17, wherein the links connecting the internal nodes are set to a meshInactive state.

19. A method in a first node for a communications network comprising a plurality of nodes interconnected by a plurality of links, the plurality of nodes comprising the first node, wherein:
the first node and one or more other nodes of the communications network are internal nodes of a distributed source tree (DST);
nodes of the communications network that are not in the DST network are external nodes;
the first node is linked to a peer node in the communications network, wherein the peer node is either an internal node or an external node, the method comprising:
(a) receiving link-state packets (LSPs), wherein each LSP comprises information for a link of the plurality of links;
(b) processing a received LSP, wherein, the processing comprises:
(i) forwarding the LSP to the other nodes of the DST network, if the LSP is received from an external node; and
(ii) not forwarding the LSP to the other nodes of the DST network, if the LSP is received from an internal node; and
(c) performing automatic maintenance of the DST network using at least one of reduced-set synchronization and recovery operation.

20. The method of claim 19, wherein:
the first node and an internal second node each manages a corresponding link-state database configured to store link-information entries for the plurality of links, wherein each link-information entry corresponds to an LSP received or generated by the corresponding node;
using reduced-set synchronization comprises synchronizing the respective link-state databases of the first node and the second node by exchanging Reduced Sequence Number Packet-Data-Units (RSNPs); and an RSNP sent by the first node to the second node does not comprise information from LSPs that are both (i) received by the first node from an internal node other than the second node and (ii) generated by an internal node.

21. The method of claim 20, wherein each corresponding link-state database comprises an upstream sending node (USN) field for each link-information entry, wherein the USN field indicates the node from which the internal node received the LSP corresponding to the link-information entry.

22. The method of claim 19, wherein:
the automatic maintenance comprises using the recovery operation;
the one or more other nodes of the DST network comprise a peer node and a first set of one or more intermediary nodes;
the first node is not linked to the peer node;
the first node is linked to at least one intermediary node in the first set;
the peer node is linked to at least one intermediary node in the first set; and
using the recovery operation comprises the first node, the peer node, and the one or more intermediary nodes using one of relay-mode recovery and switch-mode recovery.

23. The method of claim 22, wherein:
the first node, the peer node, and the one or more intermediary nodes use relay-mode recovery, wherein the first node tunnels packets to the peer node through the one or more intermediary nodes.

24. The method of claim 22, wherein the first node, peer node, and the one or more intermediary nodes use switch-mode recovery, wherein:
the first node sends a first packet to an intermediary node in the first set but not to the peer node; and
an intermediary node in the first set forwards the first packet to the peer node, wherein that intermediary node would not forward the first packet to the peer node when not using the recovery operation.

* * * * *